L. L. WILLSON.
Improvement in Harrows.
No. 132,885. Patented Nov. 5, 1872.
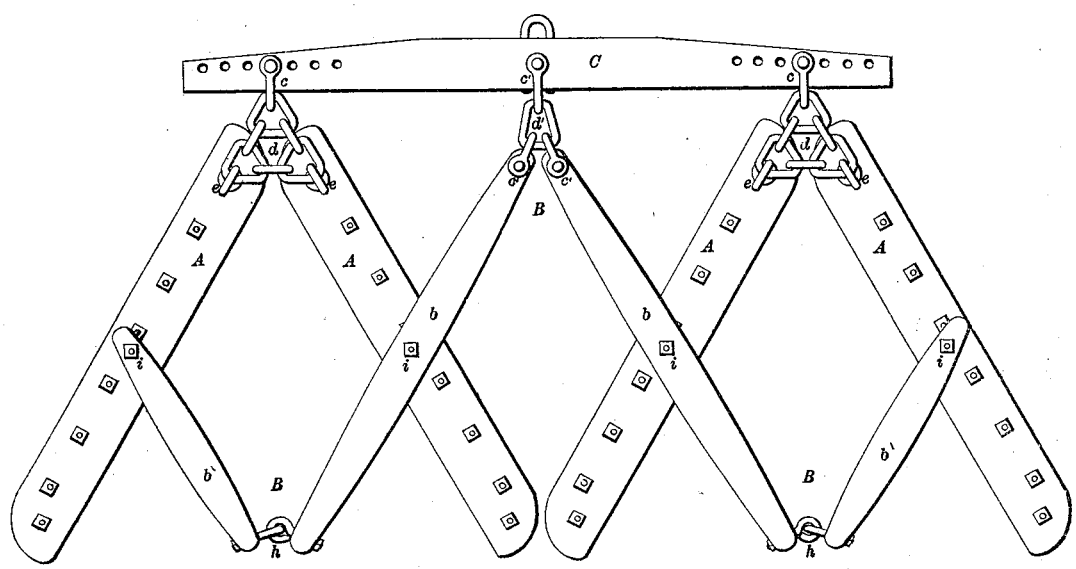
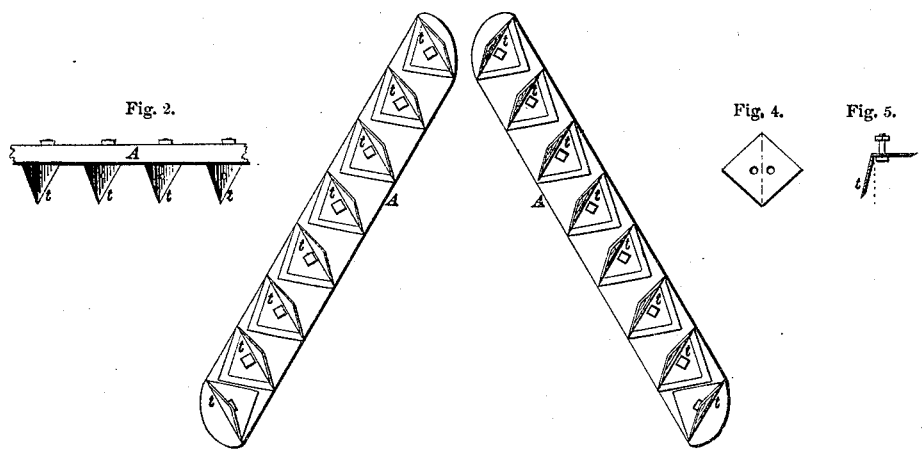
WITNESSES:
J. C. McAlpine,
Jesse Willson.
INVENTOR:
Levi L. Willson.

UNITED STATES PATENT OFFICE.

LEVI L. WILLSON, OF DENMARK, MICHIGAN.

IMPROVEMENT IN HARROWS.

Specification forming part of Letters Patent No. 132,885, dated November 5, 1872.

*To all whom it may concern:*

Be it known that I, LEVI L. WILLSON, of Denmark, in the county of Tuscola and State of Michigan, have invented a new and Improved Cultivator; and I do hereby declare that the following is a full, clear, and exact description thereof, which will enable others to make and use the same, reference being had to the accompanying drawing forming a part of this specification.

My invention has for its object to furnish cultivators which are easily constructed and effective in operation, either in pulverizing soil, cutting up weeds, or covering seed. The frame is of novel construction, and is easily adjusted to any desired width. The teeth are of peculiar form, and will readily raise over any obstruction that they cannot cut through. They are so arranged that the entire surface of the soil is turned over, each tooth making a furrow into which the soil is turned by the one following, something after the manner of plowing.

Figure 1 is a plan view. Fig. 2 is a side view of a part of the frame, showing the front side of the teeth attached. Fig. 3 is a view of two of the beams turned over to show the teeth. Fig. 4 is a plate cut and punched for a tooth, requiring to be bent at the dotted line. Fig. 5 is a vertical section of the two blades of a tooth, and shows also the bolt which secures it to the frame.

The frame is composed of the beams A, stretcher B, and cross-bar C. The beams should be of sufficient width that the teeth will not project from either edge. The two beams on each side should be attached together and to the cross-bar by means of links, as shown at $d$, Fig. 1, or by other suitable contrivance, which will permit either beam to raise or fall a few inches at the front and the other end to move freely in any direction. The stretcher consists of the long bars $b$ and the short bars $b'$, connected by a hook-and-eye hinge, or its equivalent, at $h$, bolted to the beams at $i$, having broad washers underneath to raise it above the nuts on the beams, and attached to the cross-bar by the clevises $c'$ and link $d'$, or by other suitable arrangement. $t$ represents the teeth, which, if wrought, are formed from plates cut in any desired shape, the square or rhombic being usually preferred; for some kinds of soil, however, the round or oblong form may be used with advantage. The entire edge of the plate thus formed should be sharpened with the bevel on one side, and punched each side of a diagonal line, as shown in Fig. 4, at which place it is to be bent, as shown in Fig. 5, forming two blades exactly alike, each in turn to be bolted to the beam, while the other is turned down and forms the cutting-blade. If the horizontal blade—that which is bolted to the beam—is to be turned backward, the bevel should be on the inner side; but if it is to be turned forward, the bevel should be on the outer side. It is preferable to turn the horizontal blade backward, except that of the last tooth in each beam, which should be turned in the opposite direction that the last bolt in each beam may be further from the end. The angle formed by the two blades should be ninety degrees, more or less. Any number of teeth may be used and set at whatever angle desired.

The frame may be either wood or iron. The teeth should be steel, either cast or wrought; if cast, a suitable flange for strengthening the blades should be formed at the inner angle, each side of the place for the bolt-head. The bolts by which the teeth are secured should be sufficiently heavy to hold them firmly in whatever position they may be placed, otherwise more than one bolt should be used to fasten each tooth; or the sides of the tooth at the angle may be bent slightly upward so as to press into or firmly against the beam. The bolt which secures the first tooth in each beam may have a hook formed at the head, as shown at $e$, Fig. 1, to which the links $d$, connecting the beams to the cross-bar and to each other, may be attached. The spread or sweep is regulated by attaching the clevises $c$ to the cross-bar at any desired place, as the frame will readily fold up until the beams come together or stretch out to a distance nearly equal to the combined length of all the beams. A seat may be attached in any suitable manner.

Having thus described my invention, what I claim as new, and desire to secure by Letters Patent, is—

1. The beams A A and A A and the bars $b\ b$ and $b'\ b'$, in connection with the adjustable draft-bar C, substantially as and for the purpose hereinbefore set forth.

2. The teeth $t$, substantially as and for the purpose hereinbefore set forth.

LEVI L. WILLSON.

Witnesses:
J. C. MCALPINE,
JESSE WILLSON.